United States Patent
Jagatheesan et al.

(10) Patent No.: US 9,305,554 B2
(45) Date of Patent: Apr. 5, 2016

(54) MULTI-LEVEL SPEECH RECOGNITION

(71) Applicant: Samsung Electronics Co., Ltd., Suwon-si, Gyeonggi-do (KR)

(72) Inventors: Arun Jagatheesan, Cupertino, CA (US); Juhan Lee, Issaquah, WA (US); Jong Hoon Ahnn, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/333,463

(22) Filed: Jul. 16, 2014

(65) Prior Publication Data

US 2015/0025890 A1    Jan. 22, 2015

Related U.S. Application Data

(60) Provisional application No. 61/847,513, filed on Jul. 17, 2013, provisional application No. 61/896,362, filed on Oct. 28, 2013.

(51) Int. Cl.
*G10L 15/183* (2013.01)
*G10L 15/32* (2013.01)

(52) U.S. Cl.
CPC .............. *G10L 15/32* (2013.01); *G10L 15/183* (2013.01)

(58) Field of Classification Search
CPC ....... G10L 15/22; G10L 15/265; G10L 15/28; G10L 15/30; G10L 15/1815; G10L 15/183; G10L 15/187; G10L 15/19; G10L 15/00; G10L 15/01; G10L 15/063
See application file for complete search history.

(56) References Cited

U.S. PATENT DOCUMENTS

| | | | | |
|---|---|---|---|---|
| 5,027,406 A | * | 6/1991 | Roberts et al. | 704/244 |
| 5,233,681 A | * | 8/1993 | Bahl et al. | 704/251 |
| 5,293,584 A | * | 3/1994 | Brown et al. | 704/277 |
| 5,497,447 A | * | 3/1996 | Bahl et al. | 704/245 |
| 6,128,594 A | * | 10/2000 | Gulli et al. | 704/244 |
| 6,363,348 B1 | * | 3/2002 | Besling et al. | 704/270.1 |

(Continued)

FOREIGN PATENT DOCUMENTS

WO    2004023455 A2    3/2004

OTHER PUBLICATIONS

Gouvea, E.B. et al., "Adaptation and Compensation: Approaches to Microphone and Speaker Independence in Automatic Speech Recognition", Proceedings of the ARPA Workshop on Speech Recognition Technology, 1996, pp. 1-6, Harriman, NY, United States.

(Continued)

*Primary Examiner* — Eric Yen
(74) *Attorney, Agent, or Firm* — Sherman IP LLP; Kenneth L. Sherman; Steven Laut

(57) ABSTRACT

A method and device for recognizing an utterance. The method includes transmitting context data associated with a first device to a second device. A first speech recognition model is received from the second device. The first speech recognition model is a subset of a second speech recognition model present at the second device. The first speech recognition model is based on the context data. It is determined whether the utterance can be recognized at the first device based on the first speech recognition model. If the utterance cannot be recognized at the first device, then at least a portion of the utterance is sent to the second device. If the utterance can be recognized at the first device, then an action associated with the recognized utterance is performed.

31 Claims, 13 Drawing Sheets

(56) References Cited

U.S. PATENT DOCUMENTS

| | | |
|---|---|---|
| 6,526,380 B1 * | 2/2003 | Thelen et al. ............... 704/251 |
| 6,598,018 B1 * | 7/2003 | Junqua ...................... 704/251 |
| 7,028,252 B1 | 4/2006 | Baru et al. |
| 7,693,720 B2 | 4/2010 | Kennewick et al. |
| 7,813,822 B1 | 10/2010 | Hoffberg |
| 7,976,386 B2 | 7/2011 | Tran |
| 8,326,634 B2 | 12/2012 | Di Cristo et al. |
| 8,352,246 B1 * | 1/2013 | Lloyd ............................ 704/9 |
| 8,417,233 B2 | 4/2013 | Woloshyn |
| 8,538,757 B2 | 9/2013 | Patch |
| 8,635,243 B2 | 1/2014 | Phillips et al. |
| 2002/0059066 A1 | 5/2002 | O'Hagan |
| 2002/0087315 A1 | 7/2002 | Lee et al. |
| 2002/0138272 A1 * | 9/2002 | Bennett et al. ............ 704/270 |
| 2003/0191639 A1 * | 10/2003 | Mazza ...................... 704/231 |
| 2006/0080105 A1 * | 4/2006 | Lee et al. ................. 704/270.1 |
| 2006/0271364 A1 | 11/2006 | Mirkovic et al. |
| 2009/0018829 A1 | 1/2009 | Kuperstein |
| 2011/0054899 A1 | 3/2011 | Phillips et al. |
| 2011/0161085 A1 | 6/2011 | Boda et al. |
| 2012/0245934 A1 * | 9/2012 | Talwar et al. ............... 704/235 |
| 2013/0191126 A1 * | 7/2013 | Thambiratnam et al. ..... 704/245 |
| 2013/0265261 A1 | 10/2013 | Min |

OTHER PUBLICATIONS

Doh, S-J. et al., "Weighted Principal Component MLLR for Speaker Adaptation", Proceedings of the Automatic Speech Recognition and Understanding Workshop (ASRU'99), 1999, pp. 1-4, United States.

Doh, S-J. et al., "Inter-class MLLR for Speaker Adaptation", Proceedings of the IEEE Conference on Acoustics, Speech, and Signal Processing (ICASSP'00), Jun. 5-9, 2000, pp. 1543-1546, vol. 3, IEEE, United States.

Bawab, Z.A. et al., "Deriving Vocal Tract Shapes From Electromagnetic Articulograph Data Via Geometric Adaptation and Matching", Proceedings of the Interspeech 2009, Sep. 2009, pp. 1-4, United Kingdom.

Delaney, B. et al., "Energy Aware Distributed Speech Recognition for Wireless Mobile Devices", Multimedia Communications Laboratory, Georgia Institute of Technology, Jun. 17, 2004, pp. 1-18, Hewlett-Packard Company, United States.

International Search Report and Written Opinion dated Oct. 27, 2014 for International Application No. PCT/KR2014/006516 from Korean Intellectual Property Office, pp. 1-7, Daejeon, Republic of Korea.

* cited by examiner

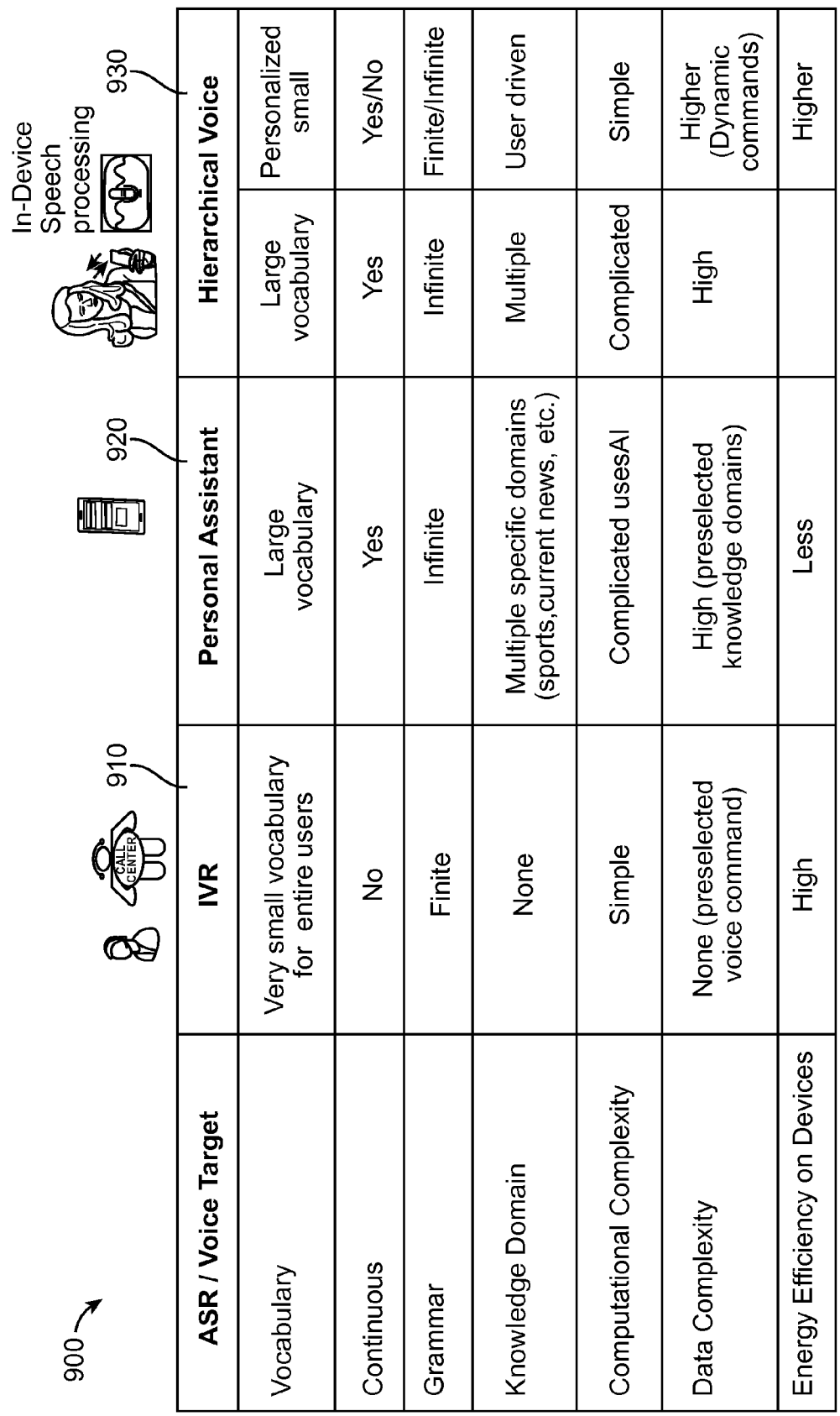

FIG. 9

| ASR / Voice Target | IVR | Personal Assistant | Hierarchical Voice |
|---|---|---|---|
| Vocabulary | Very small vocabulary for entire users | Large vocabulary | Large vocabulary | Personalized small |
| Continuous | No | Yes | Yes | Yes/No |
| Grammar | Finite | Infinite | Infinite | Finite/Infinite |
| Knowledge Domain | None | Multiple specific domains (sports, current news, etc.) | Multiple | User driven |
| Computational Complexity | Simple | Complicated usesAI | Complicated | Simple |
| Data Complexity | None (preselected voice command) | High (preselected knowledge domains) | High | Higher (Dynamic commands) |
| Energy Efficiency on Devices | High | Less | | Higher |

MULTI-LEVEL SPEECH RECOGNITION

CROSS-REFERENCE TO RELATED APPLICATIONS

This application claims the priority benefit of U.S. Provisional Patent Application Ser. No. 61/847,513, filed Jul. 17, 2013, U.S. Provisional Patent Application Ser. No. 61/896, 362, filed Oct. 28, 2013, both incorporated herein by reference in their entirety.

TECHNICAL FIELD

One or more embodiments generally relate to speech recognition, in particular, to hierarchical speech recognition processing between multiple processing levels based on criteria.

BACKGROUND

Automatic Speech recognition (ASR) has evolved over the years and is expected to be a primary form of input in computing and entertainment devices. Since speech recognition requires a large amount of computing power and energy from the battery source of mobile devices, most current solutions for speech processing are provided in a cloud environment to provide a higher accuracy rate of speech-to-text conversion.

ASR involves several steps and components. Most important, ASR components are the language model and the acoustic model. The language model explains the language or grammar of the language that is being converted to text; the language model includes a text file that contains words which the ASR can recognize. The acoustic model describes how each word is pronounced. Typically, these models (acoustic and language models) are large as they have to cover all possibilities of language for different speakers (and their voice acoustics). Usually, a larger model covers multiple scenarios and reduces the error rate.

ASR systems currently are Cloud-based ASR (Cloud-ASR) implementations that are targeted at Large Vocabulary Continuous Speech Recognition (LVCSR), and use a Deep Neural Network (DNN) Acoustic Model.

SUMMARY

One or more embodiments generally relate to multi-level (e.g., hierarchical or sequential) speech recognition processing between multiple processing levels based on criteria (e.g., capability, context, etc.). In one embodiment, a method includes transmitting context data associated with a first device to a second device. A first speech recognition model is received from the second device. The first speech recognition model is a subset of a second speech recognition model present at the second device. The first speech recognition model is based on the context data. It is determined whether the utterance can be recognized at the first device based on the first speech recognition model. If the utterance cannot be recognized at the first device, then at least a portion of the utterance is sent to the second device. If the utterance can be recognized at the first device, then an action associated with the recognized utterance is performed.

In one embodiment, an electronic device comprises a transmitter that transmits context data associated with the electronic device to a second device, and a microphone for receiving an utterance. A speech processor is configured to: receive from the second device a first speech recognition model. The first speech recognition model is a subset of a second speech recognition model present at the second device and is based on the context data. The speech processor is further configured to determine whether the utterance can be recognized at the electronic device based on the first speech recognition model, send at least a portion of the utterance to the second device if the utterance cannot be recognized at the electronic device, and perform an action associated with the recognized utterance if the utterance can be recognized at the electronic device.

In one embodiment a non-transitory computer-readable medium having instructions which when executed on a computer perform a method comprising: transmitting context data associated with a first device to a second device. The higher processing level receives from the second device a first speech recognition model. The first speech recognition model is a subset of a second speech recognition model present at the second device. The first speech recognition model is based on the context data. It is determined whether the utterance can be recognized at the first device based on the first speech recognition model. If the utterance cannot be recognized at the first device, then at least a portion of the utterance is sent to the second device. If the utterance can be recognized at the first device, then an action associated with the recognized utterance is performed.

In another embodiment, a method includes transmitting context data associated with a first device to a second device. A first speech recognition model is received from the second device. The first speech recognition model is different than a second speech recognition model present at the second device. The first speech recognition model is based on the context data. It is determined whether the utterance can be recognized at the first device based on the first speech recognition model. If the utterance cannot be recognized at the first device, then at least a portion of the utterance is sent to the second device. If the utterance can be recognized at the first device, then an action associated with the recognized utterance is performed.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 9 shows an example comparison for different technologies for ASR/voice target with an example embodiment.

DETAILED DESCRIPTION

Figure 1:
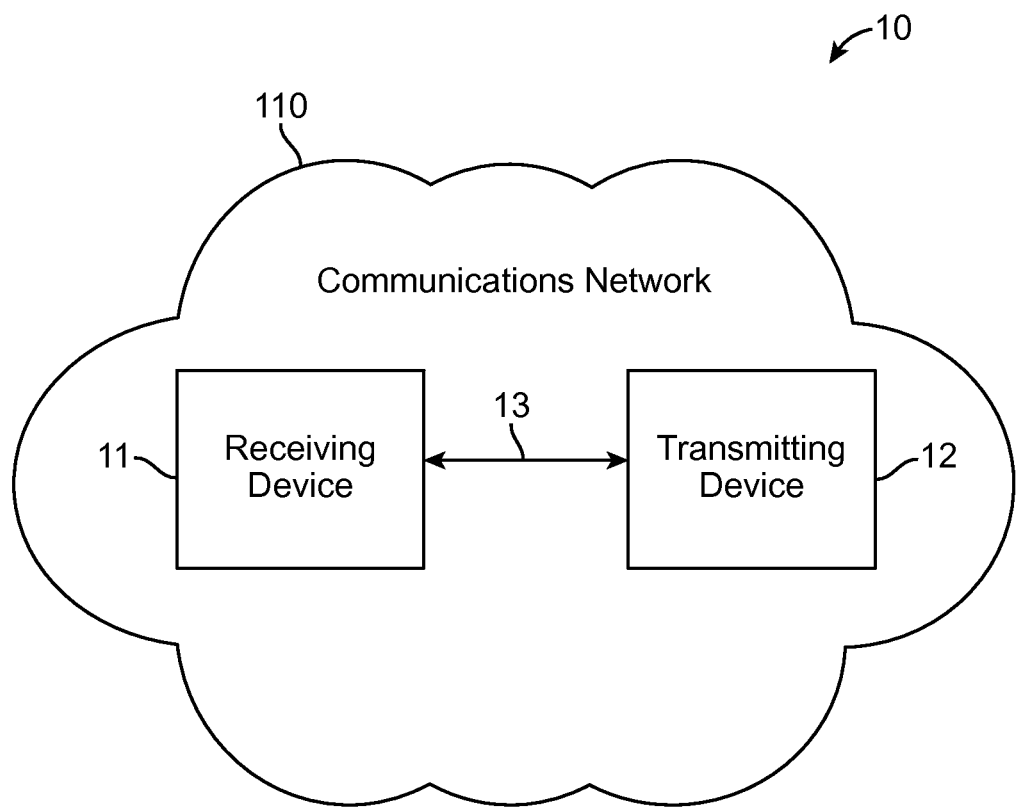
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate to hierarchical or sequential speech recognition processing between multiple processing levels based on criteria (e.g., capability). In one example, a processing level may be a platform, device, etc. that may have different processing capabilities. In one example, the processing levels may include a hierarchy of different processing levels where each processing level may have more, the same or less processing capability, such as speech processing, language models, processing power, etc. In another example, a higher level processing level may include more processing power, more speech recognition capability and/or functionality (e.g., a larger vocabulary or recognized speech capability, a larger acoustic library, better statistics for recognizing speech), etc. In one embodiment, a method includes transmitting context data associated with a first device to a second device. The first device receives from the second device a first speech recognition model. The first speech recognition model is a subset of a second speech recognition model present at the second device, and the first speech recognition model is based on the context data. The first speech recognition model can include, for example, a first language model and a first acoustic model. The second speech recognition model can include, for example, a second language model and a second acoustic model. It is determined whether the utterance can be recognized at the first device based on the first speech recognition model at the first device. If the utterance cannot be recognized at the first device, then at least a portion of the utterance is sent to the second device. If the utterance can be recognized at the first device, then an action associated with the recognized utterance is performed.

In one embodiment, periodically, the device at the higher processing level updates the language model and the acoustic model present on a client device (or lower processing level device), and this update is based on the current context of the client device and/or its user. The language model present on the client device could be a subset of the language model present at the device at the higher processing level. The acoustic model present on the client device could be a subset of the acoustic model present at the device at the higher processing level. The language model and the acoustic model are adapted to the speaker and the environment that the speaker is likely to use the system, so that there is better recognition accuracy. The adapted language model is referred to as a personalized language model (PLM), and the adapted acoustic model is referred to as a personalized acoustic model (PAM).

In an alternative embodiment, the language model present on a device at a particular processing level may not be a subset but rather may merely differ from the language model present at a device at the higher processing level. For example, the language model present on the client device may contain words that allow the client device to recognize words; however, these words may not be present in the language model at the device at the higher processing level. Similarly, the acoustic model present on a device at a particular processing level may not be a subset but rather may merely differ from the acoustic model present at a device at the higher processing level.

In yet another embodiment, the device at the lower processing level can receive multiple language models and multiple acoustic models from the device at the higher processing level. The device at the lower processing level selects one of the language models and one of the acoustic models as the prime language model and acoustic model from which the speech recognition will be based. However, the language model and the acoustic model that is designated as the prime language model and prime acoustic model can change depending on the context.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices. Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
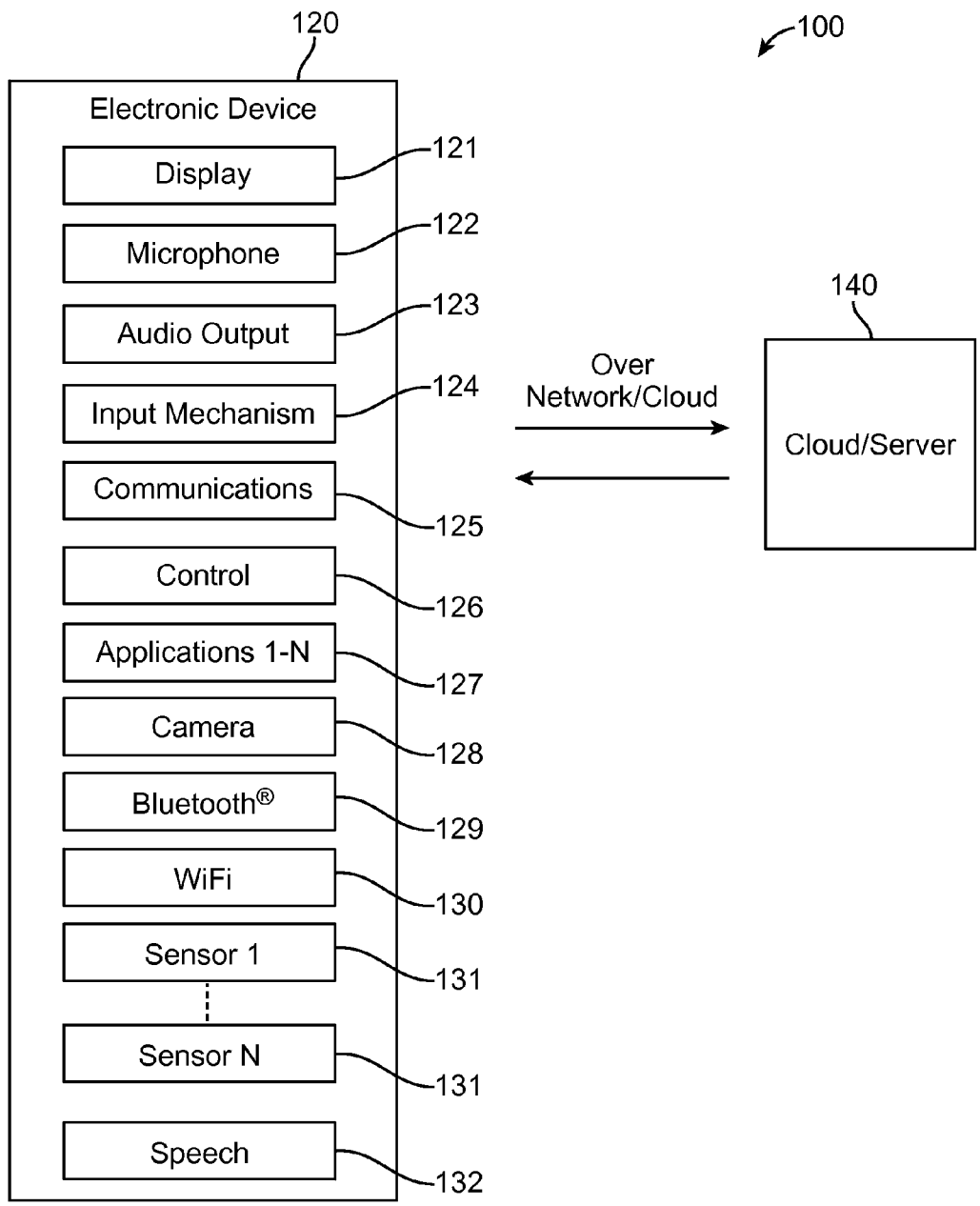
FIG. 2 shows a block diagram of architecture for a system including a server and one or more electronic devices, according to an embodiment.

FIG. 2 shows a functional block diagram of an architecture system 100 that may be used for multi-level speech recognition based on criteria using an electronic device 120. Both the transmitting device 12 and receiving device 11 may include some or all of the features of the electronics device. In one embodiment, the electronic device 120 may communicate with one another, synchronize data, information, content, etc. with one another and provide complimentary or similar features. In one embodiment, electronic device 120 may be implemented as a mobile telephone or smart phone device, a smart TV, a smart appliance, a camera, camcorder, a device with audio video capabilities, a tablet device, wearable devices, a smart home, and any other device capable of communicating wirelessly (with or without the aid of a wireless-enabling accessory system) or via wired pathways (e.g., using traditional telephone wires, network connectivity, etc.).

In one embodiment, the electronic device 120 may comprise a display 121, a microphone 122, an audio output 123, an input mechanism 124, communications circuitry 125, control circuitry 126, Applications 1-N 127, a camera module 128, a Bluetooth® module 129, a Wi-Fi module 130 and sensors 1 to N 131 (N being a positive integer), speech module 132, and any other suitable components. In one embodiment, applications 1-N 127 are provided and may be obtained from a cloud or server 140, a communications network 110, etc., where N is a positive integer equal to or greater than 1. In one embodiment, the system 100 includes an activity a geolocation triggering application that may work in combination with a cloud-based service or server 140 to assist in training for activity recognition, by itself, or a combination of the two. In one embodiment, a wearable device may include a portion or all of the features, components and modules of electronic device 120.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented.

Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app, YouTube®, etc.), social networking applications (e.g., Facebook®, Twitter®, etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the Bluetooth® module 129 comprises processes and/or programs for processing Bluetooth® information, and may include a receiver, transmitter, transceiver, etc.

In one embodiment, the electronics device 120 may include multiple sensors 1 to N 131, such as accelerometer, gyroscope, microphone, temperature, light, barometer, magnetometer, compass, radio frequency (RF) identification sensor, GPS, etc. In one embodiment, the multiple sensors 1-N 131 provide information to a geolocation triggering application 127.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

In one embodiment, electronic device 120 includes the speech module 132 that includes a multi-level speech recognition processing and one or more personalized language model (PLM) modules and personalized acoustic model (PAM) modules for hierarchical or sequential speech recognition processing using multiple devices. In one embodiment, the electronic device 120 and the speech module 132 are considered a lower hierarchy or sequential level of ASR processing, and other smart devices (e.g., a smart TV, a smart home, smart appliances, etc.).

In one embodiment, multiple-small ASRs are implemented for speech recognition. In one example, multiple-small ASRs and one-large ASR are implemented hierarchically to obtain the advantages of both. Two components of ASR are Language Model (LM) and Acoustic Model (AM). These are used in training the ASR to create a decoder that is used in the speech-to-text conversion process. ASRs have to be trained using training data before they are used to create decoders. Significant differences between the training data and test data (real-runs) results in larger Word Error Rate (WER) or degradation in recognition accuracy. Speaker based personalization of generic language models and generic acoustic models results in a PLM and PAM. The concept of the speaker personalization in an ASR engine is to adapt the general acoustic model (AM) and language model (LM) to user's own speech data so that the adapted model can provide better recognition accuracy to specific users. In one or more embodiments, the speech module 132 provides the Hierarchical Automated Speech Recognition (H-ASR or HSR), that allows electronic devices 120 to perform "selective speech recognition" by themselves as much as possible without contacting an external cloud-based ASR service. In one example, selective pre-processing of both LM and AM takes place at the cloud (server) and continuously updates the local (client or electronic device 120) ASR of the speech module 132 (as though they are being cached to save speech processing) at the clients.

In one embodiment, the selective pre-processing is performed in the cloud 140 that enables "cached processing" of speech (or other media recognition such as image) on the electronic device(s) 120. One or more embodiments provide a paradigm for distributed processing, where the behavior (user's access patterns history) is used to determine each ASR's processing capability using the speech module 132.

In one example, the speech processing eco-system implementing the speech module 132 uses publish-subscribe methodology for LMs that enables action-oriented-speech-recognition that takes place in multiple hierarchies/levels. The speech processing is passed on from one level to another until it matches a preset action item at one level. In one example, execution of "actionable commands" in multiple ASRs in the ecosystem is implemented rather than using a single large-ASR. The personalization of AM and LM in ASR is a component of HSR. In one example, while selective pre-processing is used to train ASR for specific patterns on the cloud 140, alternatively the complete adaptation process may be performed from the electronic device 120 when a network is unavailable and the electronic device's 120 resources are enough to support the processing using the speech module 132.

One or more embodiments reduce latency and use consumer's edge resources for speech-to-text-to-action translation. Selective pre-processing in the cloud 140 (top/higher hierarchy level) and cached-processing in the electronic device 120 (lower hierarchy level) is implemented as opposed to conventional ASR approaches that use Large Vocabulary Continuous Speech Recognition (LVCSR) that is performed by a single computer system (i.e., a single computer, a network, or a cloud). In one or more embodiments, the processing is fundamentally different from the conventional cloud-based LVCSR and local-offline ASR, in the order of speech processing (top hierarchy to bottom hierarchy) and also the way the lower hierarchy does only selected cached processing. In the conventional Cloud-ASR approach, the speech command is first sent to the Cloud-ASR for processing. In one or more embodiments, speech commands are first processed to text within the same network (on the same computing device, e.g., electronic device 120). If the speech-to-text translation cannot be achieved on a lower hierarchy (e.g., using the electronic device 120), it is then sent to an immediate higher hierarchy (e.g., a smart-home ASR, a smart TV ASR, or the cloud 140 ASR).

In one example, the order of speech processing in multiple hierarchies may be based on multiple networks and their vicinity. PLM and PAM of the speech module 132 are selectively processed and sent from higher hierarchies to be stored in lower hierarchies enabling almost a "cached-processing" of speech in the lower hierarchies. The publish-subscribe model for "actionable-commands" in a local hierarchy may use multiple LMs and AMs in combination or used as hierarchies of "actionable commands." In one example, a local ASR may receive "publications" from devices around it on what new words and commands it processes. For example, a SmartPhone ASR and a Smart-Home ASR may receive LM publication from a Smart-Fireplace to the ASRs, that includes the words for "Turn Fireplace ON," when the user is close to the Smart-Fireplace. This way the Smart-Fireplace is "subscribing" to the command "Turn Fireplace ON," which is an "actionable command." Actionable commands are commands that could be executed into desired actions locally without the immediate need to refer to an external system beyond the ASRs local network or its vicinity.

In one example, the capability to represent or "publish" the voice commands of any device with an intent to have them used by an ASR system, such as HSR (e.g., a Smart-Fireplace). The digital representation of "actionable commands" of any devices is referred to as its Device Language Model and Actions (DLMA), stored or transferred digitally as a DLMA file. In one example, the capability of any electronic device 120 (or central remote server acting on behalf of a device) to communicate dynamically over the network is provided to advertise its voice commands (DLMA) to an ASR and subscribe for its actionable commands.

In one embodiment, the speech module 132 may execute actionable commands in the multiple ASR environment for speech-to-action processing (rather than a single ASR). The specific vocabulary and command mappings (speech-to-text-to-command) used in actionable commands determine the order of ASRs that process a speech command until the most likely actionable command is determined. In one example, the order of speech processing within the same hierarchy (based on available action commands and their type) may include a guaranteed order of execution of actionable commands on a target device (e.g., a Smart-Fireplace) by using a gateway (either centralized or on the target device itself) that receives the speech-to-text-to-action commands from one or more local ASRs and converts them in the right order of execution (eliminating duplicates).

Figure 3:
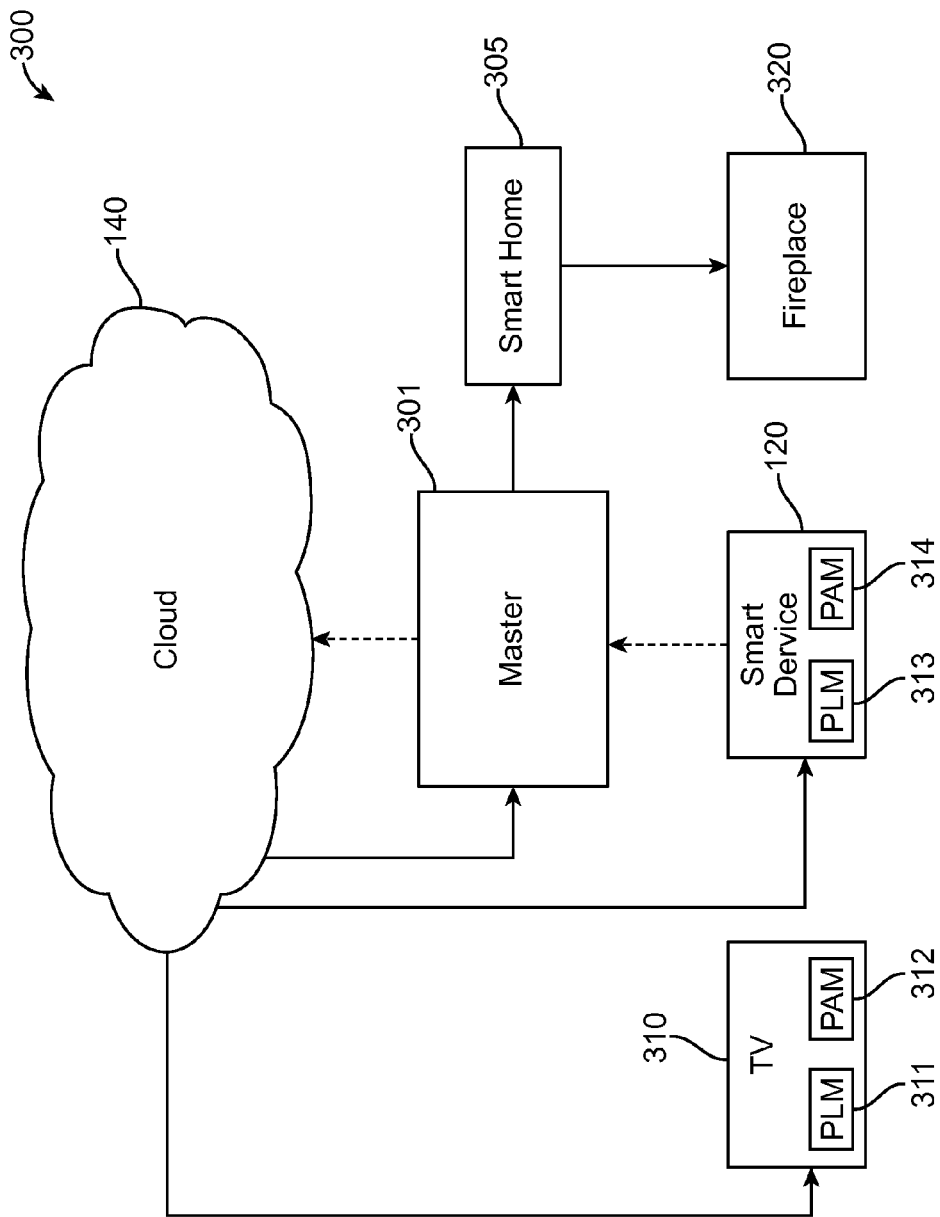
FIG. 3 shows a high-level architecture for a system, according to an embodiment.

FIG. 3 shows a high-level architecture for an HSR system 300, according to an embodiment. In one embodiment, the example HSR system 300 includes the cloud 140, a master process or device 310, a smart TV 310, an electronic device 120 (e.g., a smart device) a smart fireplace 320 and a smart home (or smart home controller) 305. In one embodiment, the smart TV 310 includes a PLM 311 and a PAM 312, and the electronic device 120 includes a PLM 313 and a PAM 314. In one example, digital transfer/transmission of PLM and PAM from a higher level system to a lower level system occurs, for example, from the cloud 140 to the Master 301—environment specific (or Cloud to Device). In one example, a digital representation of speech commands, subscription to ASR, and what actions to execute are implemented in the example HSR system 300. In case of a device that does not "hear," a third party may provide the AM and LM to the Master 301.

In the example HSR system 300, the PLM and the PAM are pre-processed at the higher level device (e.g., a server in the cloud 140) and sent to the lower level device based on the current context of the lower level device (e.g., location, time, activities using the lower level electronic device, moving/ stationary, use of other electronic devices, etc.). In one example, a device (e.g., smart TV 310, electronic device 120, etc.) selectively uses the pre-processed information for final speech recognition output.

Speech decoding may be selectively passed on from a device at one processing level to another device at a higher processing level (e.g., in a sequential or hierarchical nature) until a specific processing level is able to recognize the speech and perform an action associated with the recognized speech. For example, the speech may be transferred from the electronic device 120 (e.g., a smart phone or wearable device) to the master 301 and then to the server on the cloud 140 if the electronic device 120 and the master 301 are unable to recognize the speech. Speech may be selectively processed at a higher level system (e.g., the cloud 140) only if based on certain criteria it cannot be processed at the device. In one example, a device executes the command (actionable items) given the capability of the device. A command will change based on the concept and will be directed to a "more appropriate" device. Two basic concepts are implemented in one or more embodiments: sending PLM and PAM from the higher level to the lower level; and actionable items: commands that may be performed given capability of device. A command changes on context. A smart device (e.g., electronic device 120) is able to have capability to decide which other device in the example HSR system 300 can execute an actionable command, if the electronic device 120 is unable to do so.

In an alternative embodiment, instead of periodically sending the language model and the acoustic model to the device at the lower processing level, the language model and the acoustic model on the device at the lower processing level are updated whenever the speech cannot be recognized at the lower processing level. In this case, if the speech cannot be recognized at the lower processing level, then the speech and the context data are sent to the device at the higher processing level. The device at the higher processing level tries to process/recognize the speech. In addition, the device at the higher processing level updates the language model and the acoustic model of the device at the lower processing level based on the context data sent by the device at the lower processing level to the device at the higher processing level.

In an alternative embodiment, when speech processing occurs at a higher processing level, only a portion of the speech is passed to the higher processing level. For example, if the client device cannot process/recognize the speech, then the noise is filtered out and only the speech is transferred to the device at the higher processing level while the portion that is the noise is not transferred to the device at the higher processing level. In another example, if there are multiple speakers providing the speech input, then the speech from those who are not the user is filtered out and not sent to the device at the higher processing level.

Figure 4:
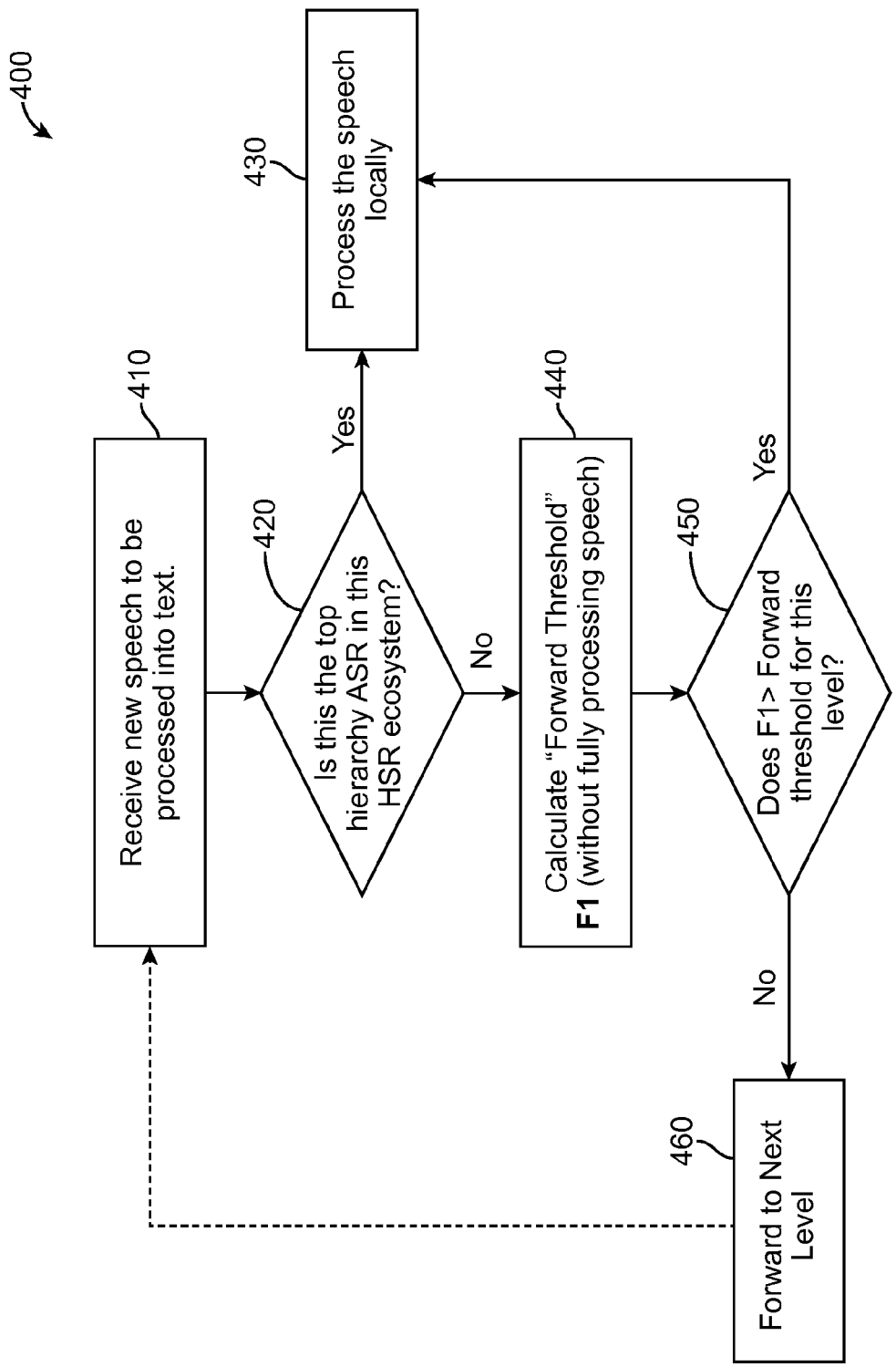
FIG. 4 shows an example automatic speech recognition (ASR) process flow, according to an embodiment.

FIG. 4 shows an example automatic speech recognition (ASR) process flow 400, according to an embodiment. In one example, the process 400 starts with block 410 where new speech to be processed into text is received (e.g., using a microphone 122 and the speech module 132, FIG. 2). In block 420, it is determined if the device receiving the speech is the top level in the HSR hierarchy eco-system. If it is determined that the device that received the speech is the top hierarchy level, then process 400 continues to block 430 where the speech is processed locally on the device. If it is determined that the device that received the speech is not the highest level in the HSR, process 400 continues to block 440. In block 440, a forward threshold F1 is calculated without fully processing the received speech. In one example, all voice commands are first processed locally in a lower-hierarchy ASR to see if it is a "hot command" that the local small ASR can process itself. Once a voice command is received, the local ASR calculates the forward-threshold to decide if it needs to process it locally or forward it to the next hierarchy level (device or cloud) in the HSR model. In one example, the forward-threshold (e.g., F1, F2, etc.) is a function of one or more of the following:

Estimated Word Error Rate (if the command were to be processed locally),

Length of the voice command,

Presence of certain keywords in the voice command (keyword spotting),

Availability of Wi-Fi or Cell-towers (to determine the energy the device battery might spend to transmit the data), Prior history of how the voice commands were handled and their metrics, and The processor, graphical processing unit (GPU) and network/radio processors on that specific device.

In one embodiment, in block 450 it is determined if the calculated/determined forward threshold (e.g., F1: first forward threshold) is greater than the forward threshold that is selected or assigned to the particular hierarchy level in the HSR. If it is determined that the forward threshold is greater than the forward threshold for the HSR level, than the process 400 proceeds to block 430. Otherwise, process 400 continues to block 460 where the received speech is forwarded to the next level in the HSR and the process 400 continues back to block 410. As the next level in the HSR is processed, the next level forwarding threshold (e.g., F2: second forward threshold) is calculated and compared in block 450, and the processing continues until the speech is processed at the HSR level that is capable (or the most capable) for processing the speech for recognition and determining the action commands.

Figure 5:
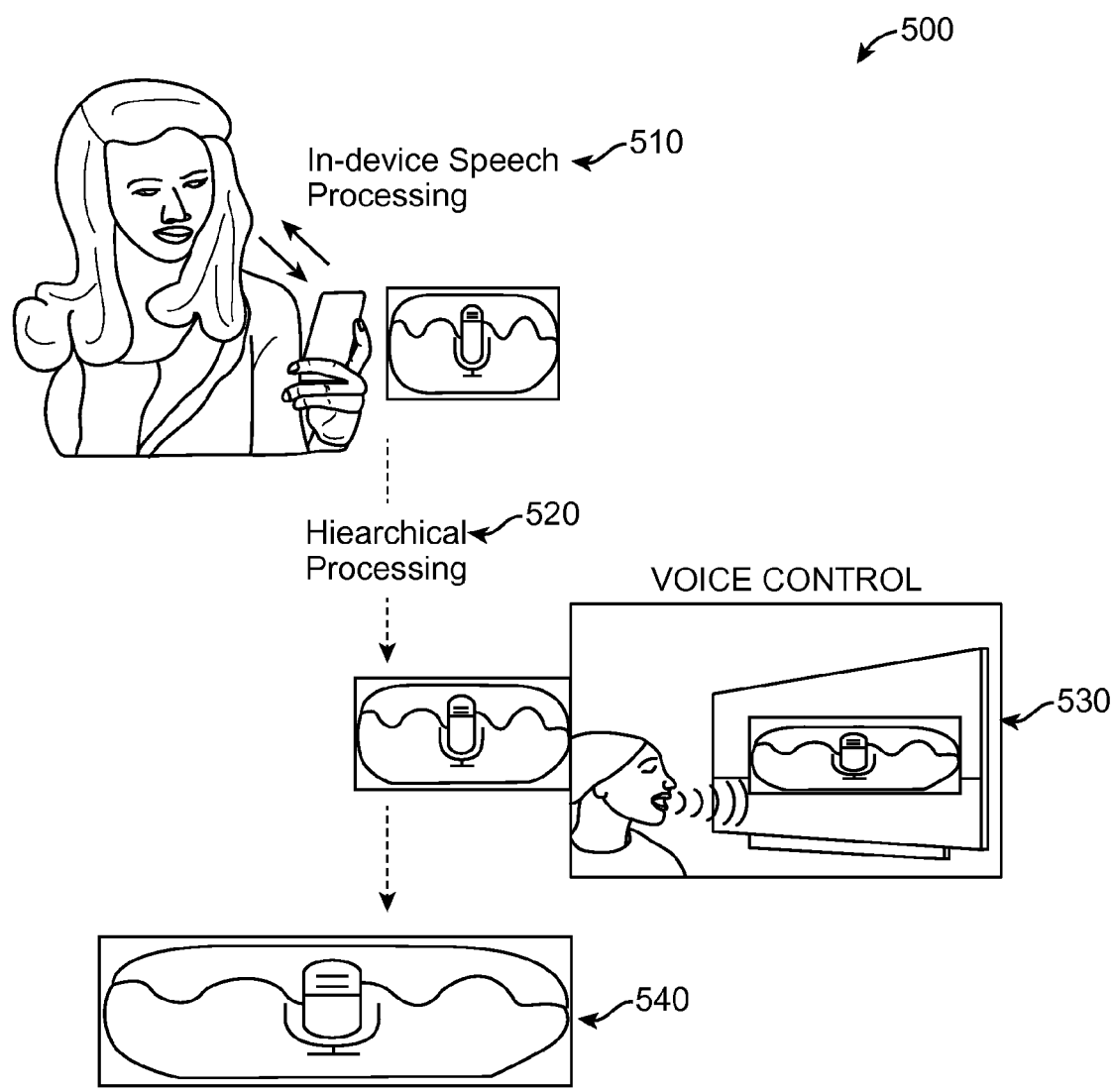
FIG. 5 shows an example hierarchical speech recognition (HSR) eco-system with in-device, near-by ASR and cloud ASR, according to an embodiment.

FIG. 5 shows an example HSR eco-system 500 with in-device 510, near-by ASR and cloud ASR 520, according to an embodiment. In the example HSR eco-system 500, either the local device (e.g., an electronic device 120) or another device in the HSR system 500 (e.g., a smart device with voice control capability 530) is used for voice command processing 540. In the example HSR ecosystem 500, an order of ASR hierarchy is used to process the speech. This order may dynamically change over time as ASRs leave or are added to the network or vicinity. (e.g., a smart-phone ASR within a smart-home that leaves away from an HSR ecosystem in a house as the user leaves the home). This network-vicinity order may be based on signal strength, network availability, latency, WER of speech processing and other historical details in a self-organizing speech processing hierarchy. In one example, amongst the available choices, the lowest latency that may actively handle frequently used action commands is given preference to be the lower hierarchy. In another example, the ASR with more accurate WER for wide range of commands is given preference as the higher hierarchy level (even if its latency is more, such as a cloud in a different network). Alternatively, the network vicinity order of multiple ASRs that take part in the example HSR ecosystem 500 may be pre-determined or decided by their class type (e.g., an electronic device 120 (FIG. 2) is of lower class 1, a Smart-TV is of class 2, a smart appliance is of class 3, a Smart-Home system is of class-4 and a cloud based ASR may be of class 5.

In one embodiment, in the example, HSR ecosystem 500 selectively pre-processed speech models (trained and adapted) in another network are sent to a local device (e.g., an electronic device 120). Personalized Language Model (PLM) and Personalized Acoustic Model (PAM) that are "selectively processed" and sent from higher hierarchies to be stored in lower hierarchies enabling almost a "cached-processing" of speech in lower hierarchies. In the example HSR ecosystem 500, the higher level ASR in the hierarchy (e.g., the cloud), may generate the PLM and PAM using data it has acquired about the speaker at multiple times. For example, if it finds the speaker is most likely to call certain friends on a Friday evening, or turn on a TV once at home, those relevant speech commands and the acoustics associated with only that environment (e.g., car or home) may be used in a PAM or PLM. A PLM is a smaller, geolocation/time-specific and rather than covering all the words and its variations in a language, uses only the words and grammar that a speaker is expected to use. Similarly a smaller, geolocation/time-specific PAM is also used in HSR. In one example, the speaker's voice is used to build a PAM. Additionally, rather than using a one-size-fit-all model for all users, the example HSR ecosystem 500 uses multiple PAMs based on geolocation/time specific affinity of the user. Hence, the same user would have multiple PAMs based on their location and time of day (e.g., one PAM for driving in car, one PAM for being at an office or home, etc.).

In one example, PLM and PAM represent selective processing of high-frequency or most-expected voice commands of a speaker at a particular point of time. In one embodiment, the PLM and PAM are transferred digitally from ASRs in a higher hierarchy level (such as a cloud) to lower hierarchy levels so that it enables cached processing of the frequent hot words, with less processing on the lower hierarchy level devices. This feature provides the lower hierarchy level ASR to process the high-frequency or "hot words or commands" locally with less processing power and better accuracy (or lower error rate), since there are less words and acoustics to be processed.

Figure 6:
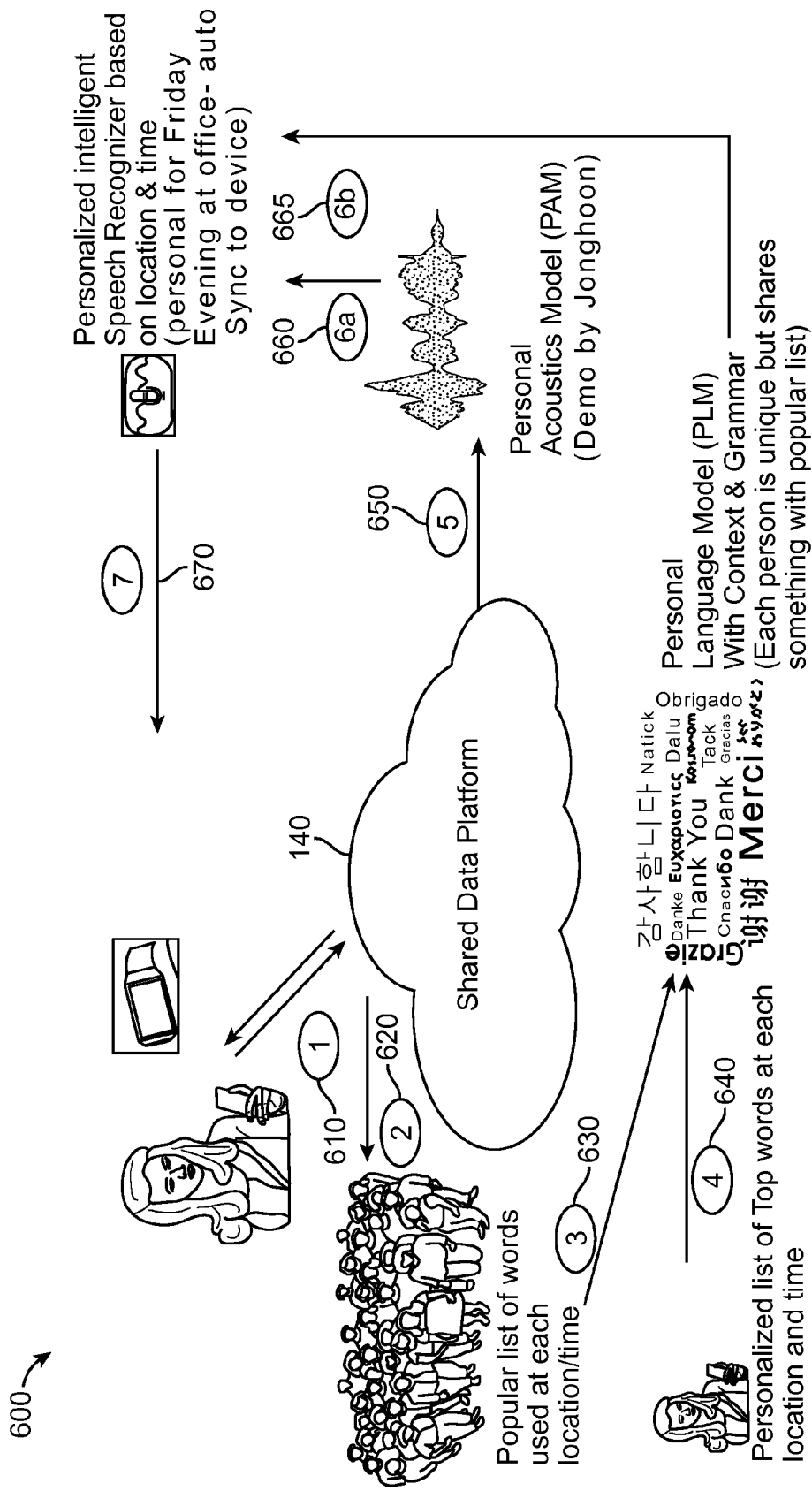
FIG. 6 shows an example scenario for HSR connected to a cloud environment, according to an embodiment.

FIG. 6 shows an example scenario 600 for HSR connected to a cloud environment, according to an embodiment. In the example 600, a cloud 140 ASR finds that a speaker: calls wife, plays radio stations and gives destination names once he is in a smart-car. The cloud 140 ASR does all the processing for the words used and updates the smart-car's ASR with PLM and PAM specific to audio settings of that car and the microphone in that car. This will make sure the user's privacy is little bit more secure and also a faster (low-latency) speech processing is available. The same user, once he reaches home, "turns on TV," "closes garage door," etc. in a smart-home. The cloud 140 ASR again creates PLM on words used in home by (one or more users) and updates the PLM and PAM for the specific acoustics of the home and the microphones that are used in the smart-home.

In the example 600, the user enters a speech command at 610. Based on the location and time, the cloud 140 requests 620 and receives 630 a popular list of words that are location (e.g., zip code, geolocation, place, etc.) and time specific for the location. At 640, the specific user's personalized list of top words at specific locations, places and times are used for determining PLM. At 650, the information received by the cloud 140 at 630 is used to determine along with the information received at 640 to forward a PAM at 660 and PLM at 665. At 670, a personalized intelligent speech recognizer (e.g., using the speech module 132, FIG. 2) is used based on location and time for recognizing the speech command entered at 610.

Figure 7:
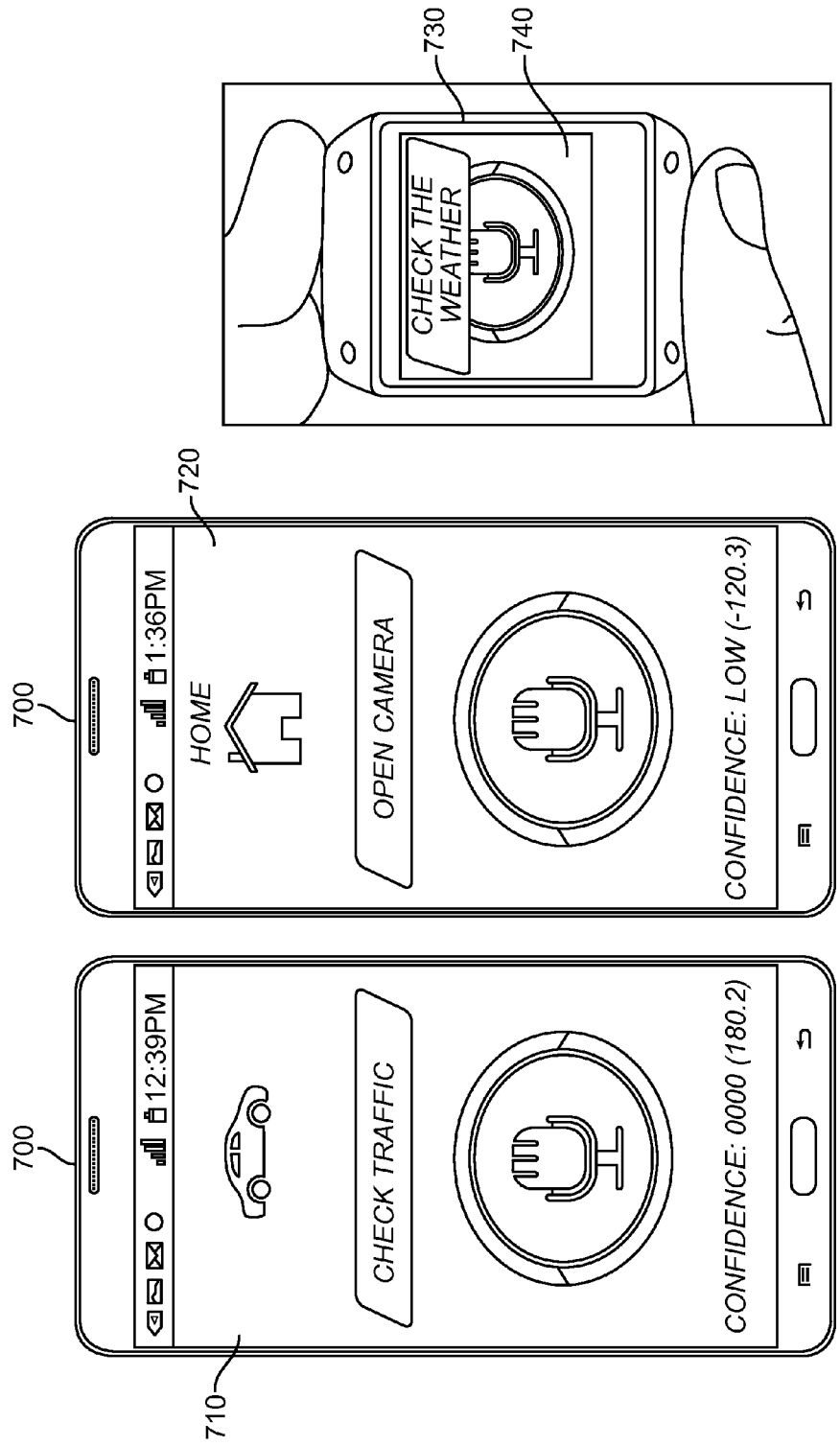
FIGS. 7A-C show examples of local processing of a HSR-ecosystem lower hierarchy ASR, according to an embodiment.

FIGS. 7A-C show examples of local processing of a HSR-ecosystem lower hierarchy ASR, according to an embodiment. In one example, FIG. 7A shows electronic device 700 (e.g., an electronic device 120) with an ASR and PLM and PAM for the location in a car at a specific time (e.g., early morning commute, evening commute, etc.) for traffic showing a GUI 710. FIG. 7B shows a device 700 with an ASR with a PLM and PAM for the location in a home at a specific time (e.g., home from work) for home commands showing a GUI 720. FIG. 7C shows a device 730 (e.g., a wearable device) with an ASR with a PLM and PAM for the location at a specific city at a specific time for weather related commands showing a GUI 740. In one embodiment, the examples in FIGS. 7A-C show local processing of an HSR-ecosystem lower hierarchy ASR without contacting the higher hierarchy (e.g., a smart TV or a cloud 140, FIG. 2).

Figure 8:
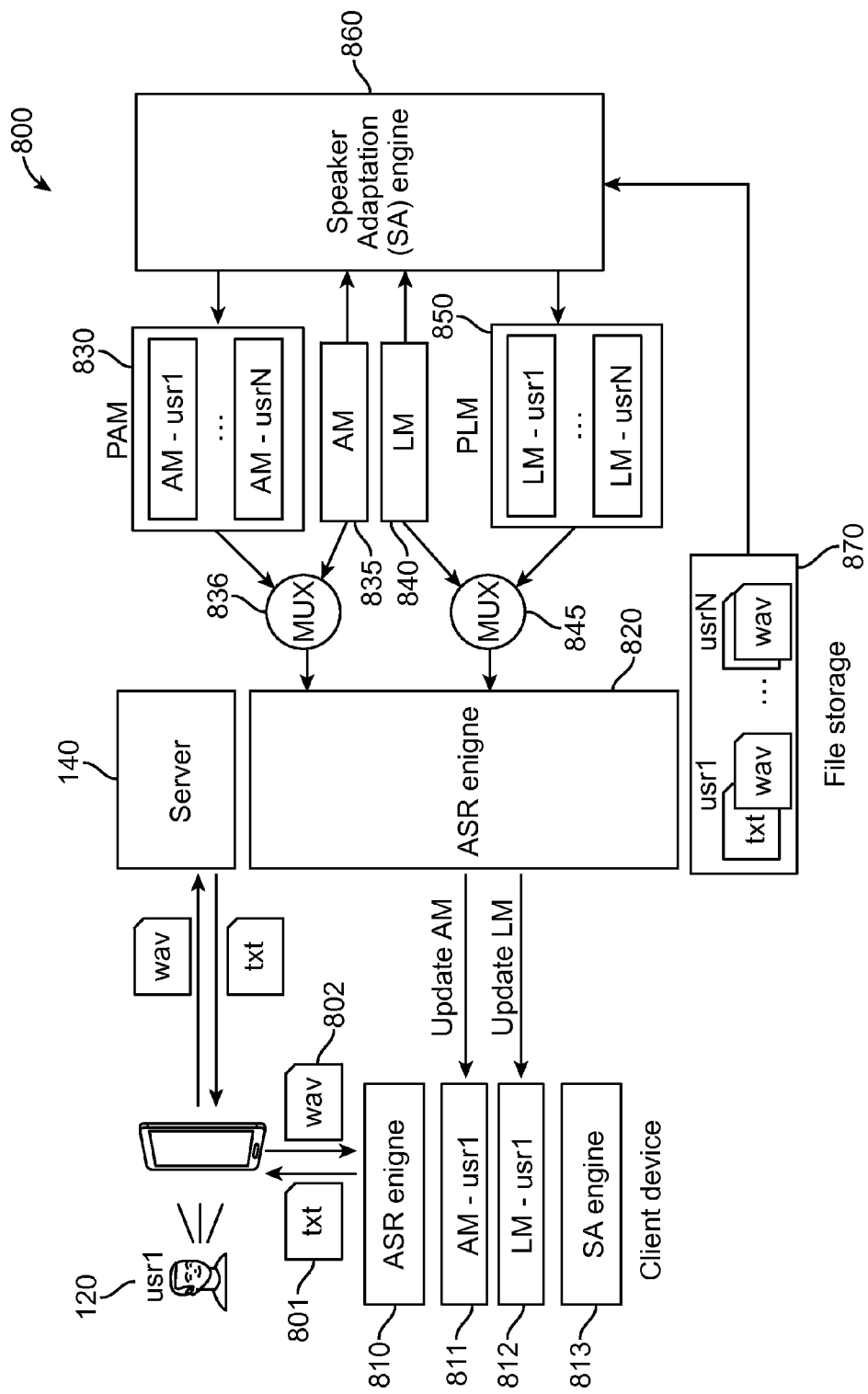
FIG. 8 shows an example ASR architecture and speaker adaptation, according to an embodiment.

FIG. 8 shows an example ASR architecture and speaker adaptation system 800, according to an embodiment. In one example, the electronic device 120 includes a speech module 132 (FIG. 2) that converts speech from a user 1 (usr1) to a wav file 802 that is processed using the ASR engine 810, the AM 811 (for usr1), the LM 812 (for usr1) and a speaker adaptation (SA) engine 813. At the lower HSR level, the electronic device 120, itself, processes the speech and converts the speech to text 801. The cloud/server 140, at the higher level in the HSR, may also receive the wav file 802 and process the speech using the ASR engine 820 and the SA engine 860 based on the stored usr1-N 870 prior usage, used by the SA 860 to generate the PLM 850 (LM for usr1-N) and PAM 830 (AM usr1-N) using AM 835 and LM 840, where PLM 850 is combined with LM 840 (e.g., using a MUX 845), and PAM 830 is combined with AM 835 (e.g., using a MUX 836).

In one example, the electronic device 120 has the capability to represent or "publish" the voice commands of the electronic device 120 with an intent to have them used by an ASR system such as system 800. In one example, the electronic device 120 has a voice-based interface, like a remote control (but by voice). For example, the electronic device 120 may receive voice commands for a smart-fireplace, which has "actionable" or "hot commands" such as "Turn Fireplace ON." All the actionable commands of the electronic device 120 are represented digitally in a file (e.g., wav 802, txt 801). This representation may be in binary or text format—providing the language/grammar that needs to be added along with PLM to enable local processing of the command and also the action item that needs to taken (e.g., send a signal over the network to a fireplace with parameters "ON"). The digital format of action items for the electronic device 120 may be a DLMA file. An example DLMA file is shown below:

```
#DLMA V1.0;
grammar main;
sub-grammar fireplace;
public <utt> = ( (TURN ON FIREPLACE) |
(TURN OFF FIREPLACE) |
(INCREASE FIRE LEVEL) |
(REDUCE FIRE LEVEL) );
.
```

In the system 800, the capability of any device, such as electronic device 120 (or central remote server acting on behalf of a device) to communicate dynamically over the network to advertise its voice commands (DLMA) to an ASR and subscribe for its "actionable commands" is implemented. In one embodiment, in the system 800 (e.g., an HSR ecosystem or any ASR), the electronic device 120 sends (publishes) its voice commands over the network to ASRs in its vicinity using a DLMA or other files to get its actions commands from that particular ASR or any ASR in the HSR eco-system.

In one example, the order of speech processing within the hierarchy of system 800 is based on available action commands and their type. While the HSR ecosystem provides a way for hierarchy to migrate from one level to the next immediate level higher ASR, it is possible that for some commands or keywords, the ASR may directly send a request to multiple ASR levels or exclusively to the top level ASR based on the particular keywords. For example, "Search for Taj Mahal's height." The search here is likely to be followed by some command that needs more information or data from a search engine or "calculate 5+4." These commands may just be transferred to the Cloud-ASR for faster processing.

In one embodiment, the system 800 has a guaranteed order of execution of actionable commands on a target device (e.g., a Smart-Fireplace by using a gateway) (either centralized or on the target device itself) that receives the speech-to-text-to-action commands from one or more local ASRs and converts them in the right order of execution (eliminating duplicates).

In one embodiment, some commands must only be executed once (e.g., there could be multiple ASRs in a living room (Smart TV, smart phone, smart watch, smart house ASR, etc.). If a user says "Increase Fire Level," all the ASRs may pick the command and relay it to the processing unit (fireplace) and this could end up increasing the fire level multiple times. To avoid this, in one embodiment "action commands" are categorized as idempotent or non-idempotent. A gateway may be used to process these commands so that duplicate commands are avoided.

In one embodiment, in system 800, a user (e.g., usr1) speaks to the electronic device 120, and a speech file wav 802 is sent to the cloud 140 (or server) where an ASR engine 820 is located. The ASR engine 820 invokes the AM 835 and LM 840 to recognize the user's speech in an automatic fashion. The SA engine 860 checks the number of user's speech files stored in the file system 870 of the cloud 140 to see if the number exceeds a certain threshold (e.g., 100). If this is the case, the SA engine 860 generates a new PAM 830 for each user upon user's speech files, transcript, and the existing AM (e.g., usr1 AM 811). The resultant PAM 830 is stored to the clouds's file system 870. Periodically, the cloud 140 sends the up-to-date PAM back to the electronic device 120 to be utilized by the local ASR engine 810 if needed. When the user's electronic device 120 senses low battery or unstable network conditions, the local ASR engine 810 in the electronic device 120 is loaded and used for the speech recognition application. For a case where the network is unavailable, the SA engine 860 may operate on the electronic device 120 independently from the cloud 140. For a given client device, a multiple user scenario may be easily supposed by invoking multiple PAMs and PLMs from the client device or the cloud 140 depending on battery and network conditions.

FIG. 9 shows an example comparison 900 for different technologies for ASR/voice target with an example embodiment. As shown, the comparison 900 compares IVR 910 and personal assistant 920 technology with the HSR implementations 930 of one or more embodiments. The comparisons are based on vocabulary, continuous performance, grammar, knowledge domain, computation complexity, data complexity and energy efficiency on devices.

Figure 10:
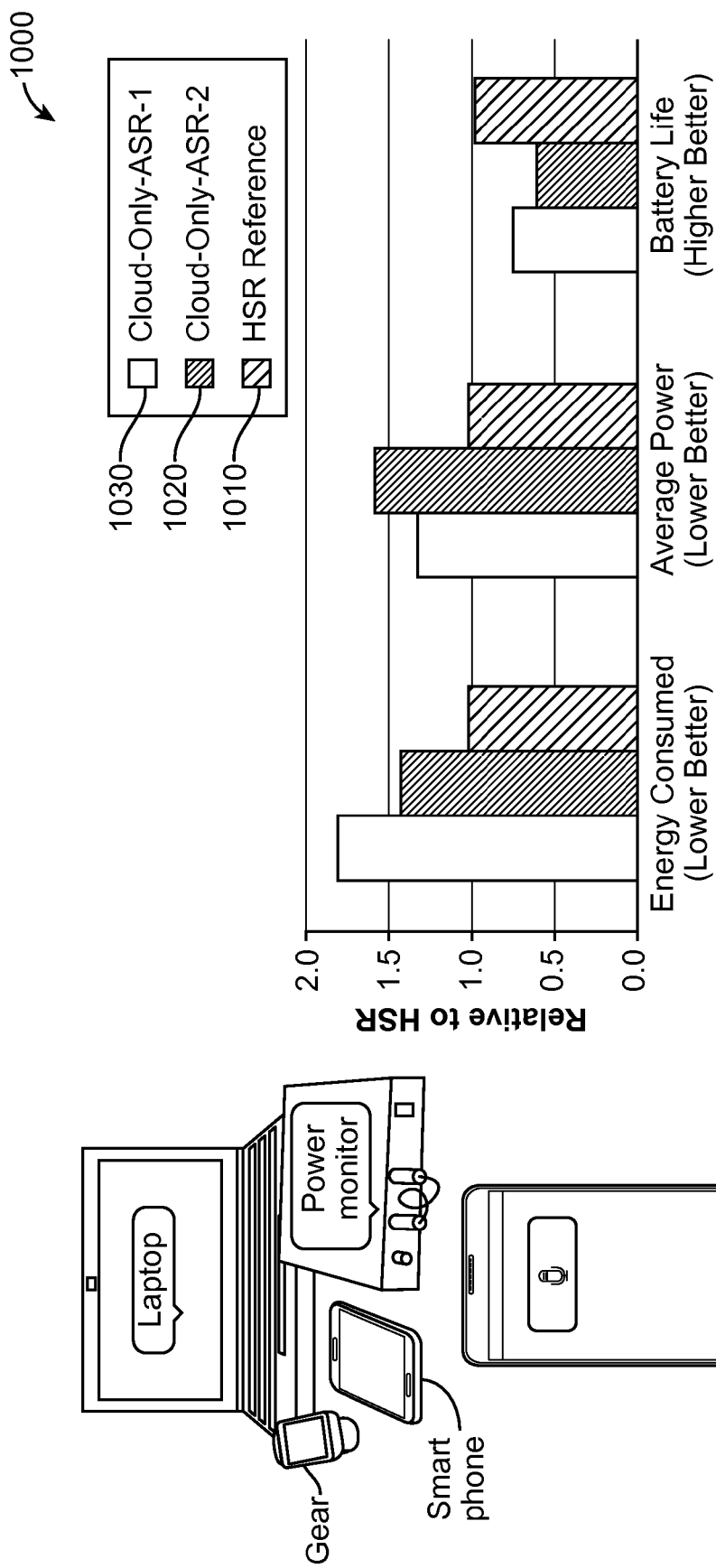
FIG. 10 shows an example comparison for cloud-only ASR and with an example HSR embodiment.

FIG. 10 shows an example comparison 1000 for cloud-only ASR-1 1030, ASR-2 1020 and an example HSR 1010 embodiment. The comparison shows energy consumed (lower the better), average power (lower the better) and battery life (the higher the better) for a typical mobile device implementation.

Figure 11:
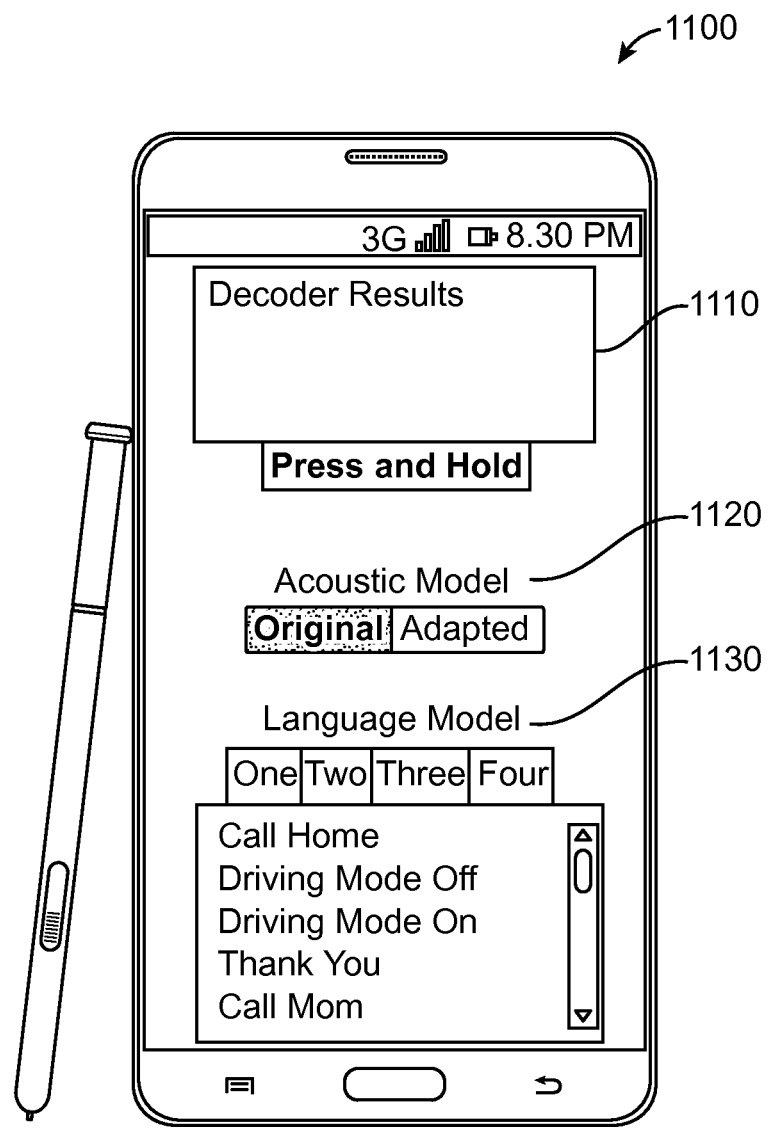
FIG. 11 shows an example graphical user interface (GUI) for a smart device including one or more local selective language models and acoustic models, according to an embodiment.

FIG. 11 shows an example graphical user interface (GUI) 1100 for a smart device (e.g., electronic device 120) including one or more local selective language models and acoustic models, according to an embodiment. As shown, the example GUI 1100 shows decode results 1110, selection for an AM 1120, and selection for LM 1130. Additionally, a menu (e.g., scrollable, drop-down, etc.) is shown for selecting types of scenarios, which have scenario specific language that is commonly used.

Figure 12:
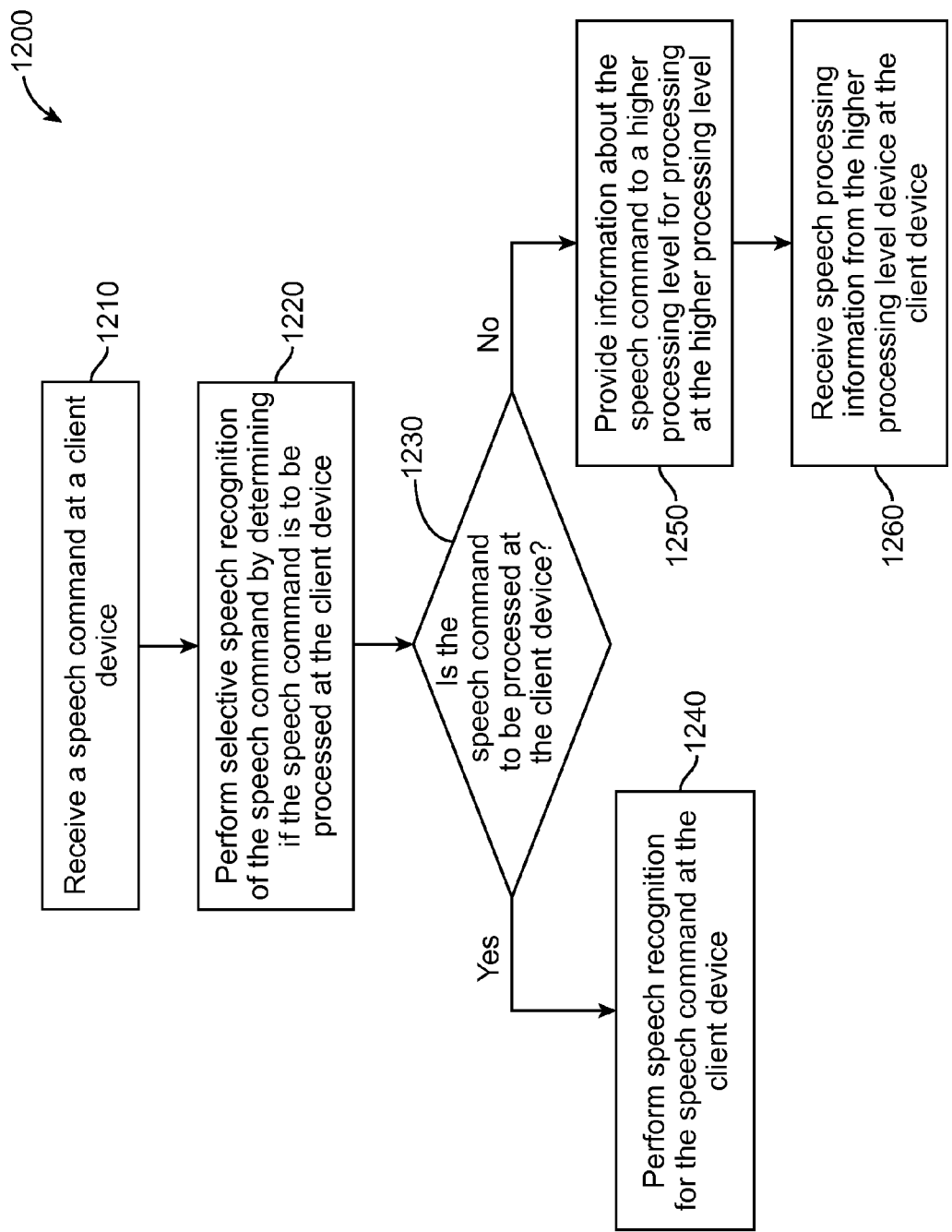
FIG. 12 shows a block diagram of an example process, according to one embodiment.

FIG. 12 shows a block diagram of an example process 1200, according to one embodiment. In one embodiment, in block 1210 a speech command is received at a client device (e.g., electronic device 120, FIG. 2). In block 1220, selective speech recognition of the speech command is performed by determining if the speech command is to be processed at the client device. In block 1230, if the speech command is to be processed at the client device, then process 1200 proceeds to block 1240 where speech recognition for the speech command is performed at the client device. Otherwise, in block 1250 information about the speech command is provided to a higher processing level (e.g., another electronic device 120 at a higher level, a cloud 140, FIG. 2, etc.) for processing at the higher processing level. Processing at the higher processing level includes PLM and PAM information at the higher processing level. In block 1260 speech processing information is received from the higher processing level at the client device.

In one example, process 1200 may include performing speech recognition for the speech command at the client device based on the speech processing information from the higher processing level. In one embodiment, process 1200 may include receiving the speech processing information at the client device and performing speech recognition for the speech command at the client device based on the speech processing information.

In one example, speech recognition comprises determining an actionable command based on the speech command. In one example, process 1200 may include obtaining a digital representation of the speech command for performing the actionable command. In one example, obtaining a digital representation of the speech command comprises obtaining said digital representation from an external source. In one embodiment, the actionable command comprises commands that are performable based on device capability. In one example, speech decoding is selectively passed between the client device and one or more other higher processing level devices in a sequential processing sequence or a hierarchical processing sequence.

In one embodiment, the sequential processing sequence or the hierarchical processing sequence may continue until a particular processing level is matched to execute the actionable command. In one example, process 1200 may include selectively pre-processing speech recognition in a cloud environment based on one or more criteria (e.g., location, geolocation, time, current activity, etc.) and determining capability for multiple ASR implementations based on user criteria. In one example, the actionable command is executed based on multiple language models and multiple acoustic models. Multiple actionable commands may be published by networked devices and subscribed to by one or more of the networked devices.

In one embodiment, the process 1200 may include transmitting context data associated with a first device to a second device. A first speech model is received from the second device. The first speech recognition model is a subset of a second speech recognition model present at the second device. The first speech recognition model is based on the context data. It is determined whether the utterance can be recognized at the first device based on the first speech recognition model. If the utterance cannot be recognized at the first device, then at least a portion of the utterance is sent to the second device. If the utterance can be recognized at the first device, then an action associated with the recognized utterance is performed.

Process 1200 may include that the second device is at a higher processing level than the first device. Process 1200 may further include that the first speech recognition model includes at least one of: a first language model and a first acoustic model, and the second speech recognition model includes at least one of: a second language model and a second acoustic model. In one example, if the utterance can be processed at the first device, then recognizing the utterance and executing an action locally at the first device that is associated with the utterance. Process 1200 may further include that when the first device is near a third device, a third speech recognition model is received from the third device and the third speech recognition model allows the first device to process another utterance associated with the third device, and allows the third device to execute locally the processed other utterance. In one embodiment, determining whether the utterance can be processed at the first device based on the first speech recognition model comprises determining if a threshold value is exceeded based on at least one of: an estimated word error rate, length of utterance, presence of keywords in the utterance, availability of a network connection, prior history of processing the utterance, and a processing capability of the first device.

In one example, process 1200 may perform speech processing within a hierarchy of devices that includes a guaranteed order of execution of actions on a target device based on using a gateway that determines order of action execution.

In one example, one or more HSR system or devices provide for: making ASR ready for local processing in a smart-home or smart-car environment; lower latency (or instant response) to speech commands that are dynamically personalized to work on each device (no need to transfer speech command to a cloud and match the command to a personalized look-up table at run-time); energy savings in smart phone or other electronic devices 120 (FIG. 2) is achieved by avoiding frequent usage of smart phone radio and network usage; data transfer costs are reduced for frequent voice commands that do not need to use a cloud-ASR; the client-side ASR's service is useful when the network is unstable or even unavailable; the SA processing from the back-end server assists to save the client device's energy consumption; the client-side speaker adaptation processing is useful when the network is unavailable while the server-side processing is commonly considered in ASR service; as client devices become more powerful in computation and efficiency in energy consumption, the client-side processing is more preferable; and a hybrid SA model where some jobs are performed in the client device and other jobs are performed in the server is useful to reduce traffic (load) on the cloud-ASR service (distributing the load across multiple ASRs).

Figure 13:
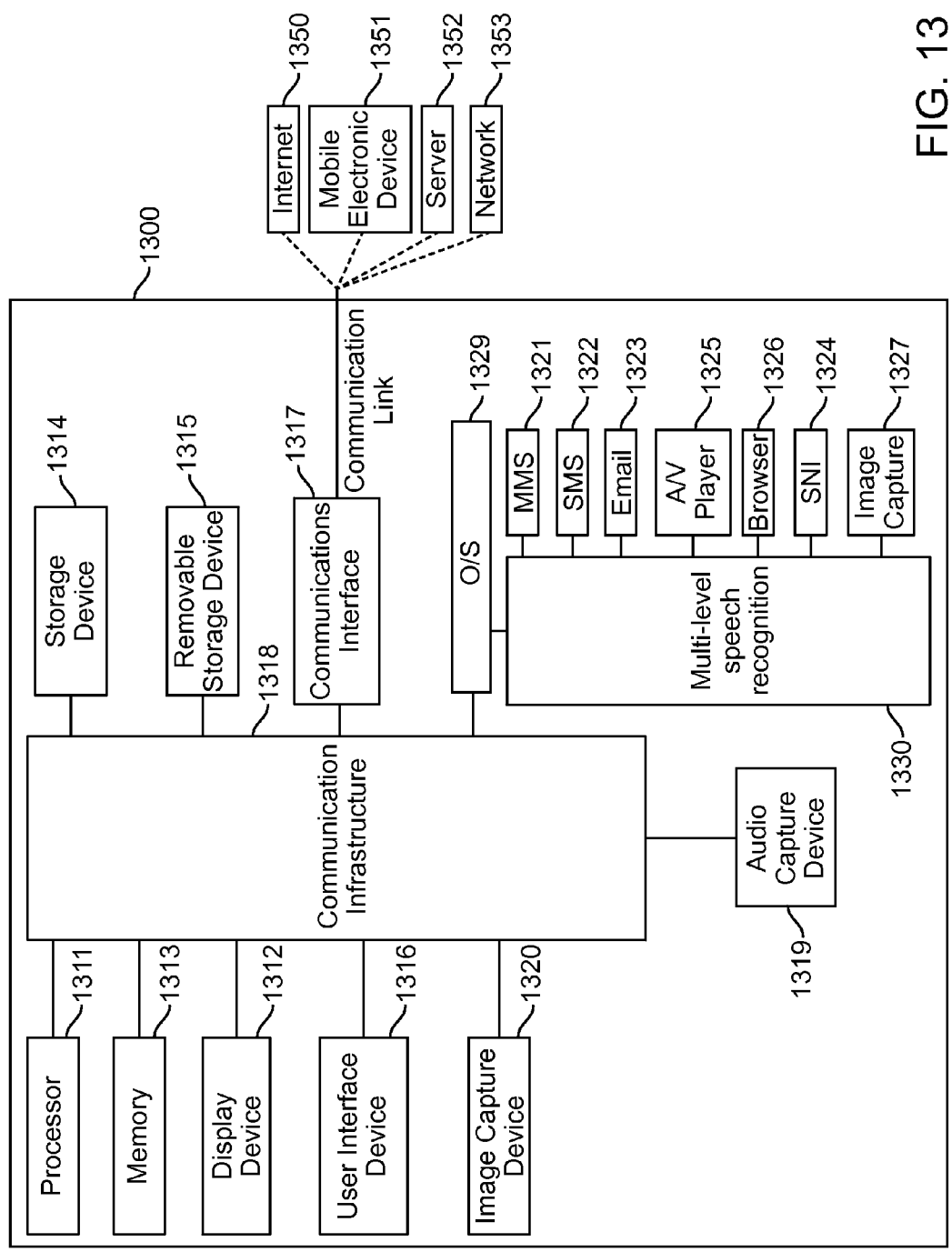
FIG. 13 is a high-level block diagram showing an information processing system comprising a computing system implementing one or more embodiments.

FIG. 13 is a high-level block diagram showing an information processing system comprising a computing system 1300 implementing one or more embodiments. The system 1300 includes one or more processors 1311 (e.g., ASIC, CPU, etc.), and may further include an electronic display device 1312 (for displaying graphics, text, and other data), a main memory 1313 (e.g., random access memory (RAM), cache devices, etc.), storage device 1314 (e.g., hard disk drive), removable storage device 1315 (e.g., removable storage drive, removable memory module, a magnetic tape drive, optical disk drive, computer-readable medium having stored therein computer software and/or data), user interface device 1316 (e.g., keyboard, touch screen, keypad, pointing device), and a communication interface 1317 (e.g., modem, wireless transceiver (such as Wi-Fi, Cellular), a network interface (such as an Ethernet card), a communications port, or a PCMCIA slot and card).

The communication interface 1317 allows software and data to be transferred between the computer system and external devices through the Internet 1350, mobile electronic device 1351, a server 1352, a network 1353, etc. The system 1300 further includes a communications infrastructure 1318 (e.g., a communications bus, cross bar, or network) to which the aforementioned devices/modules 1311 through 1317 are connected.

The information transferred via communications interface 1317 may be in the form of signals such as electronic, electromagnetic, optical, or other signals capable of being received by communications interface 1317, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, smartphone, tablet, mobile computing device, wearable device, etc.), the system 1300 further includes an image capture device 1320, such as a camera 128 (FIG. 2), and an audio capture device 1319, such as a microphone 122 (FIG. 2). The system 1300 may further include application modules as MMS module 1321, SMS module 1322, email module 1323, social network interface (SNI) module 1324, audio/video (AV) player 1325, web browser 1326, image capture module 1327, etc.

In one embodiment, the system 1300 includes a multi-level speech recognition module 1330 that may implement system 300 processing similar as described regarding (FIG. 3), and components in block diagram 100 (FIG. 2). In one embodiment, the multi-level speech recognition module 1330 may implement the system 300 (FIG. 3), and 800 (FIG. 8) and flow diagrams 400 (FIG. 4), and 1200 (FIG. 12). In one embodiment, the multi-level speech recognition module 1330 along with an operating system 1329 may be implemented as executable code residing in a memory of the system 1300. In another embodiment, the multi-level speech recognition module 1330 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   obtaining, by a first electronic device, context data comprising at least one of location, time and activity, wherein the context data is associated with the first electronic device;
   transmitting, by the first electronic device, the context data to a second electronic device;
   receiving, by the first electronic device, a first speech recognition model, the first speech recognition model being a subset of a second speech recognition model present at the second electronic device, wherein the first speech recognition model is selected based on the context data;
   determining, by the first electronic device, whether an utterance can be recognized by a speech recognition process, wherein the speech recognition process is performed by the first electronic device and uses the first speech recognition model;
   in response to determining that the utterance cannot be recognized by the speech recognition process, sending, by the first electronic device, at least a portion of the utterance to the second electronic device; and in response to determining that the utterance can be recognized by the speech recognition process, causing, by the first electronic device, performance of an action associated with the utterance.

2. The method of claim 1, wherein the second electronic device comprises a higher level of processing capability than the first electronic device.

3. The method of claim 1, wherein:
the first speech recognition model includes at least one of: a first language model and a first acoustic model; and
the second speech recognition model includes at least one of: a second language model and a second acoustic model.

4. The method of claim 1 wherein the action associated with the utterance is performed locally at the first electronic device.

5. The method of claim 1 further comprising:
upon a determination that the first electronic device is near a third electronic device, receiving, by the first electronic device, a third speech recognition model from the third electronic device; and
transmitting, by the first electronic device, speech recognition information to the third electronic device, wherein the speech recognition information is generated by recognizing an utterance that is received by the third electronic device.

6. The method of claim 1, wherein:
the determining whether the utterance can be recognized by the speech recognition process comprises determining whether a threshold value is exceeded; and
the threshold value is based on at least one of: an estimated word error rate, a length of an utterance, presence of keywords in an utterance, availability of a network connection, prior history of processing an utterance, and a processing capability of the first electronic device.

7. The method of claim 1, further comprising:
receiving, by the first electronic device, speech recognition information that is based on selective pre-processing of speech recognition, wherein the selective pre-processing is based on the context data.

8. The method of claim 4, further comprising determining, by the first electronic device, a particular electronic device that is in a vicinity of the first electronic device and that is capable of executing the action.

9. The method of claim 1, wherein:
the speech recognition process is configured to occur within a hierarchy of electronic devices and includes a guaranteed order of execution of actions; and
the guaranteed order of execution of actions is based on using a gateway configured to determine order of action execution.

10. The method of claim 1, wherein:
the speech recognition process includes speech decoding;
the speech decoding is selectively passed between the first electronic device and one or more electronic devices that have a higher processing level than the first electronic device; and
the speech decoding is processed sequentially or hierarchically.

11. The method of claim 10, wherein the speech decoding continues until a particular processing level is matched.

12. The method of claim 1, further comprising:
determining, using access patterns, at least one automatic speech recognition (ASR) implementation, wherein the action is executed based on multiple language models and multiple acoustic models, and wherein multiple actionable commands are published by and are subscribed to by one or more networked devices.

13. The method of claim 1, wherein the first electronic device is a mobile electronic device, a smart appliance device, smart television device, or a smart home system.

14. A first electronic device comprising:
a processor device configured to obtain context data comprising at least one of location, time and activity, wherein the context data is associated with the first electronic device;
a transmitter configured to transmit the context data to a second electronic device;
a microphone configured to capture an utterance; and
a speech processor configured to: receive a first speech recognition model, wherein the first speech recognition model is a subset of a second speech recognition model present at the second electronic device, and the first speech recognition model is selected based on the context data, determine whether the utterance can be recognized by a speech recognition process, wherein the speech recognition process is performed by the speech processor and uses the first speech recognition model, send at least a portion of the utterance to the second electronic device in response to a determination that the utterance cannot be recognized by the speech recognition process, and upon a determination that the utterance can be recognized by the speech recognition process, causing by the first electronic device, performance of an action associated with the utterance.

15. The first electronic device of claim 14, wherein the second electronic device comprises a higher level of processing capability than the first electronic device.

16. The first electronic device of claim 14, wherein:
the first speech recognition model includes at least one of: a first language model and a first acoustic model; and
the second speech recognition model includes at least one of: a second language model and a second acoustic model.

17. The first electronic device of claim 14, wherein:
the speech processor is configured to:
receive a third speech recognition model from a third electronic device; and when the first electronic device is near the third electronic device, process, using the third speech recognition model, an utterance received by the third electronic device;
the transmitter is configured to transmit speech recognition information to the third electronic device; and
the speech recognition information is generated by recognizing the utterance received by the third electronic device.

18. The first electronic device of claim 14, wherein:
the speech processor is configured to determine whether a threshold value is exceeded; and
the threshold value is based on at least one of: an estimated word error rate, a length of an utterance, presence of keywords in an utterance, availability of a network connection, prior history of processing an utterance, and a processing capability of the first electronic device.

19. The first electronic device of claim 16, wherein:
the speech processor is configured to receive speech recognition information that is based on selective pre-processing speech recognition; and
the selective pre-processing is based on the context data.

20. The first electronic device of claim 16, wherein:
the action comprises commands;
the commands are performable based on device capability;

the speech recognition process includes speech decoding;
the speech decoding is selectively passed between the first electronic device and one or more electronic devices that have a higher processing level than the first electronic device; and
the speech decoding is processed sequentially or hierarchically.

21. The first electronic device of claim 19, wherein:
the first electronic device is configured to receive at least one automatic speech recognition (ASR) implementation; and
the at least one ASR implementation is selected based on access patterns.

22. The first electronic device of claim 14, wherein:
the action is executed based on multiple language models and multiple acoustic models; and
multiple actionable commands are published by and are subscribed to by one or more devices networked with the first electronic device.

23. The first electronic device of claim 14, wherein the first electronic device is a mobile electronic device, a smart appliance, smart television device, or a smart home system.

24. A non-transitory processor-readable medium that includes a program that, when executed by a processor, performs a method comprising:
obtaining, by a first electronic device, context data comprising at least one of location, time and activity, wherein the context data is associated with the first electronic device;
transmitting, by the first electronic device, the context data to a second electronic device;
receiving, by the first electronic device, a first speech recognition model, wherein the first speech recognition model is a subset of a second speech recognition model present at the second electronic device, wherein the first speech recognition model is selected based on the context data;
determining, by the first electronic device, whether an utterance can be recognized by a speech recognition process, wherein the speech recognition process is performed by the first electronic device and uses the first speech recognition model;
in response to determining that the utterance cannot be recognized by the speech recognition process, sending, by the first electronic device, at least a portion of the utterance to the second electronic device; and
in response to determining that the utterance can be recognized by the speech recognition process, causing the first electronic device to perform an action associated with the utterance.

25. The non-transitory processor-readable medium of claim 24, wherein the second electronic device comprises a higher level of processing capability than the first electronic device.

26. The non-transitory processor-readable medium of claim 24, wherein:
the first speech recognition model includes at least one of: a first language mod and a first acoustic model; and
the second speech recognition model includes at least one of: a second language model and a second acoustic model.

27. The non-transitory processor-readable medium of claim 24, the method further comprising:
upon a determination that the first electronic device is near a third electronic device, receiving, by the first electronic device, a third language model from the third electronic device;
transmitting, by the first electronic device, speech recognition information to the third electronic device, wherein the speech recognition information is generated by recognizing an utterance that is received by the third electronic device;
wherein:
the determining whether the utterance can be recognized by the speech recognition process comprises determining whether a threshold value is exceeded; and
the threshold value is based on at least one of: an estimated word error rate, a length of an utterance, presence of keywords in an utterance, availability of a network connection, prior history of recognizing an utterance, and a processing capability of the first electronic device.

28. The non-transitory processor-readable medium of claim 24, the method further comprising:
receiving, by the first electronic device, speech recognition information that is based on selective pre-processing of speech recognition, wherein the selective pre-processing is based on the context data; and
determining, by the first electronic device, a particular electronic device that is in a vicinity of the first electronic device and that is capable of executing the action.

29. The non-transitory processor-readable medium of claim 24, wherein:
the speech recognition process includes speech decoding;
speech decoding is selectively passed between the first electronic device and one or more electronic devices that have a higher processing level than the first electronic device;
the speech decoding is processed sequentially or hierarchically;
the speech decoding continues until a particular processing level is matched;
the action is executed based on multiple language models and multiple acoustic models; and
multiple actionable commands are published by and are subscribed to by one or more networked devices.

30. The non-transitory processor-readable medium of claim 24, wherein the first electronic device is a mobile electronic device, a smart appliance device, smart television device, or a smart home system.

31. A method comprising:
obtaining, by a first electronic device, context data comprising at least one of location, time and activity, wherein the context data is associated with the first electronic device;
transmitting, by the first electronic device, the context data to a second electronic device;
receiving, by the first electronic device, a first speech recognition model, wherein the first speech recognition model is different than a second speech recognition model present at the second electronic device, wherein the first speech recognition model is selected based on the context data;
determining, by the first electronic device, whether an utterance can be recognized by a speech recognition process, wherein the speech recognition process is performed by the first electronic device and uses the first speech recognition model;
in response to determining that the utterance cannot be recognized by the speech recognition process, sending, by the first electronic device, at least a portion of the utterance to the second electronic device; and in response to determining that the utterance can be recognized by the speech recognition process, causing the first electronic device to perform an action associated with the utterance.

\* \* \* \* \*